(12) United States Patent
Wu

(10) Patent No.: US 8,475,657 B2
(45) Date of Patent: Jul. 2, 2013

(54) METHOD AND DEVICE FOR FILTERING LIQUID IN AN AQUARIUM

(75) Inventor: Wang Wu, Shenzhen (CN)

(73) Assignee: Shenzhen Xingrisheng Industrial Co., Ltd., Shenzhen (CN)

(*) Notice: Subject to any disclaimer, the term of this patent is extended or adjusted under 35 U.S.C. 154(b) by 463 days.

(21) Appl. No.: 12/745,320

(22) PCT Filed: Oct. 22, 2008

(86) PCT No.: PCT/CN2008/001778
§ 371 (c)(1),
(2), (4) Date: Jun. 10, 2010

(87) PCT Pub. No.: WO2009/117861
PCT Pub. Date: Oct. 1, 2009

(65) Prior Publication Data
US 2010/0307971 A1  Dec. 9, 2010

(30) Foreign Application Priority Data
Mar. 25, 2008  (CN) .......................... 2008 1 0066271

(51) Int. Cl.
*A01K 63/04* (2006.01)
(52) U.S. Cl.
USPC ................... 210/167.22; 210/232; 210/416.2; 210/460; 119/260
(58) Field of Classification Search
USPC .................. 210/167.21, 167.22, 167.27, 232, 210/416.1, 416.2, 460, 461, 489; 119/259, 119/260
See application file for complete search history.

(56) References Cited

U.S. PATENT DOCUMENTS 4,369,112 A   1/1983  Vincent et al. ............. 210/433.2
4,622,148 A * 11/1986  Willinger ...................... 210/615

(Continued)

FOREIGN PATENT DOCUMENTS

CN   2121986   11/1992
CN   2207385    9/1995

(Continued)

OTHER PUBLICATIONS

International Search Report for related application PCT/CN2008/001778 filed Oct. 22, 2008; 6 page, mailed on Feb. 5, 2009.

*Primary Examiner* — Fred Prince
(74) *Attorney, Agent, or Firm* — Westman, Champlin & Kelly, P.A.

(57) ABSTRACT

The method and device for filtering liquid in an aquarium, the filtration device made by the liquid filtration method comprises a box-shaped casing, the filtration bodies and filtration materials are set inside the casing, wherein the casing includes a water inlet set around the casing and grid panels set inside both sides of the casing; the filtration bodies include an inner filtration body set inside the grid panels and an outer filtration body set outside the grid panels; the filtration materials are filled inside the casing, between the inner filtration body and grid panels; in this way, the liquid to be filtered enters into the casing through the water inlet and flows out from the grid panels, and proceeds further from the casing via the inner filtration body, filtration materials and outer filtration body treatment. The liquid filtration device has the advantages of being an integrated replacement as a filtration consumable, good universality, convenient installation and maintenance, large filtration area and effective prevention of dirt left after filtration from a backflow.

14 Claims, 4 Drawing Sheets

U.S. PATENT DOCUMENTS

| | | | |
|---|---|---|---|
| 5,059,315 A * | 10/1991 | Senape | 210/167.25 |
| 6,422,396 B1 * | 7/2002 | Li et al. | 210/489 |
| 7,353,956 B2 * | 4/2008 | Lynn et al. | 210/489 |
| 2004/0206679 A1 | 10/2004 | Bleigh | 210/97 |
| 2005/0218057 A1 | 10/2005 | Ngee | 210/224 |
| 2009/0289001 A1 * | 11/2009 | Marioni | 210/167.21 |

FOREIGN PATENT DOCUMENTS

| | | |
|---|---|---|
| CN | 2215183 | 12/1995 |
| CN | 2384429 | 6/2000 |
| CN | 2503963 | 8/2002 |
| CN | 101259340 | 9/2008 |

* cited by examiner

Fig. 7

METHOD AND DEVICE FOR FILTERING LIQUID IN AN AQUARIUM

CROSS-REFERENCE TO RELATED APPLICATION

This Application is a Section 371 National Stage Application of International Application No. PCT/CN2008/001778, filed Oct. 22, 2008 and published as WO 2009/117861 on Oct. 1, 2009, in English, the contents of which are hereby incorporated by reference in their entirety.

THE FIELD OF THE INVENTION

The present invention relates to a wastewater treatment method and device, and more especially, to a method and device for the filtration treatment of water in an aquatic breeding tank (called 'aquarium' for short hereinafter).

BACKGROUND OF THE INVENTION

The Prior art for the filtration treatment of water in an aquarium generally comprises four types:

1. Using an out-aquarium filtration barrel: this method can have good filtration effect, but it has disadvantages of occupying a large area due to the high volume of the filtration barrel, inconvenience of installation, maintenance and replacement of filtration consumable, as well as relatively high cost;

2. Using a filter at the upper or the rear-end of the aquarium: this method has good filtration effect, but it has disadvantages of structural restriction of an aquarium to filter installation, poor universality and the occurrence of the dirt attached to filtration consumable flowing back to the aquarium during the replacement of the filtration consumable;

3. Using a submersible filter: this method is very convenient for installation, maintenance and replacement of filtration consumable, but the water inflow for filtration is suction type, so the filter has disadvantages of relatively small filtration section within the effective space, relatively low water filtration efficiency and the occurrence of the dirt attached to the filtration consumable flowing back to the aquarium during the replacement of the filtration consumable;

4. Using the hung filter outside-aquarium: this method completes liquid filtration treatment through a cardcase-shaped filtration insert, so the installation, maintenance and utilization are ideally convenient; however, the cardcase-shaped filtration insert as a filtration consumable may be blocked after operation of its filtration bodies for some time, so some liquid may steer clear of or pass over the cardcase-shaped filtration insert and not be filtered, thus decreasing the filtration effect; moreover, the dirt attached to the cardcase-shaped filtration insert is prone to flow back to the aquarium during the replacement of the cardcase-shaped filtration insert.

Considering the fact that the application of the Prior art to the water filtration treatment methods for aquarium has some defects respectively and cannot meet the requirements for the water treatment of aquarium, it is necessary to develop a new liquid filtration method and device with an improved structure so as to satisfy the market demand.

SUMMARY OF THE INVENTION

The technical problem the present invention aims to settle is to, by avoiding the defects of the prior art, provide a method and device for filtering liquid in an aquarium; the utilization of the method and device can get a large filtration area of water and high filtration efficiency; furthermore, the integrated replacement of liquid filtration device as a filtration consumable can effectively prevent the backflow of dirt left after filtration and greatly facilitate the installation and maintenance.

The technical solution adopted to resolve the said problem is as follows:

Provide a method for filtering liquid in an aquarium, comprising the following steps:

A. Use a box-shaped liquid filtration device, set water inlet around a box-shaped casing of the filtration device and set grid panels inside both sides of the casing, after the liquid to be filtered flows through the water inlet into the filtration device, the clean liquid filtered flows out from the grid panels;

B. The inner filtration body and outer filtration body are set respectively inside and outside the grid panels of the filtration device, between the inner filtration body and grid panels sets the filtration materials.

In Step A, the casing of the filtration device includes two enclosures with symmetrically set grid panels, wherein the two enclosures are integrated as a whole by means of ultrasonic welding or adhesive.

The Step B further comprises the following steps:

B1. The two outer filtration bodies are respectively fixed outside the grid panels of their own by means of adhesive or heating sticking;

B2. Two filtration body hold-down with grids are set by taking the central plane parallel to the grid panels as a symmetrical plane in the filtration device;

B3. The two filtration body hold-down are fixed respectively inside the casing together with the inner filtration bodies of their own, thus forming the first buffer space between the opposite sides of the two filtration body hold-down, the second buffer space between the surrounding of the two filtration body hold-down and the inner wall of the enclosure, and two third buffer spaces between the corresponding inner filtration bodies and the grid panels.

B4. The filtration materials are filled in the two third buffer spaces respectively.

In Step B3, the two filtration body hold-down are fixed respectively inside the casing together with the inner filtration bodies of their own by means of ultrasonic welding, adhesive, tight fit or snaps. Otherwise, at least two bosses are set respectively on the positions corresponding to the opposite sides of the two filtration body hold-down, thus forming the first buffer space between the opposite sides of the two filtration body hold-down.

Based on the abovementioned technical solution, in Step A, both grid panels include the first grid zone near the water inlet of the filtration device and the second grid zone away from the water inlet respectively, wherein the mesh area for the first grid zone is larger than that for the second grid zone; in Step B4, grain-sized filtration materials for ion exchange or absorbing harmful substances in the water are filled in the third buffer space corresponding to the first grid zone; grain-sized filtration material capable of culturing nitrifying bacteria are filled in the third buffer space corresponding to the second grid zone. The grain-sized filtration materials for ion exchange or absorbing harmful substances in water are activated carbon or Maifanite, a medicinal stone; grain-sized filtration materials capable of culturing nitrifying bacteria are zeolite.

Moreover, the water permeability of the inner filtration body is higher than that of the outer filtration body.

The filtration device can be applied to the filter with the existing technology as a filtration consumable. Therefore, the aforesaid filtration method further includes Step C: with aid of necessary pipes, the water inlet of the filtration device is connected with a submersible pump or a filter hung outside the aquarium.

The technical solution adopted to resolve the said problem is as follows:

Manufacture a device for filtering liquid in an aquarium by the abovementioned method, comprising a box-shaped casing, filtration bodies and filtration materials, wherein the box-shaped casing includes a water inlet set around the easing and grid panels set inside both sides of the casing; the filtration bodies include an inner filtration body set inside the grid panels and an outer filtration body set outside the grid panels; the filtration materials are filled inside the casing, between the inner filtration body and grid panels; in this way, the liquid to be filtered enters into the casing through the water inlet and will flow out from the grid panels and proceed further from the casing via the treatment of the inner filtration body, filtration materials and outer filtration body.

The casing includes two enclosures with symmetrically set grid panels of their own, wherein the two enclosures are integrated as a whole.

The said device for filtering liquid further comprising two filtration body hold-down with grids taking the central plane parallel to grid panels as symmetrical plane in the casing; the outer filtration bodies are respectively fixed outside the grid panels of their own; the inner filtration bodies are respectively fixed between the grid panels of their own and the filtration body hold-down; the two filtration body hold-down are fixed respectively inside the casing together with the inner filtration bodies of their own, forming the first buffer space between the two filtration body hold-down, the second buffer space between the surrounding of the two filtration body hold-down and the inner wall of the casing, two third buffer spaces between the inner filtration bodies and the grid panels of their own correspondingly; the filtration materials are respectively filled in the third buffer space.

At least two bosses of their own are set on the positions corresponding to the opposite sides of the two filtration body hold-down, thus forming the first buffer space between the two filtration body hold-down.

The grid panels respectively include the first grid zones near the water inlet and the second grid zones away from the water inlet; the mesh area for the first grid zones is larger than that for the second grid zone; the filtration materials include the grain-sized filtration materials for ion exchange or absorbing harmful substances in water that is filled in the third buffer space corresponding to the first grid zones, and the grain-sized filtration materials capable of culturing nitrifying bacteria that are filled in the third buffer space corresponding to the second grid zone. The grain-sized filtration materials for ion exchange or absorbing harmful substances in water are activated carbon or Maifanite, a medicinal stone; the grain-sized filtration materials capable of culturing nitrifying bacteria are zeolite.

The water permeability of the inner filtration bodies is higher than that of the outer filtration bodies.

The appearance of the box-shaped casing may be rectangular, cylindrical, elliptical or polygon-cylindrical. The meshes of the grid panels are formed by more than two horizontally-set and vertically-set ribs, the each grid panel as a whole is plank in shape, or the each grid panel as a whole can be also designed with cylindrical surface in shape.

The casing and filtration body hold-down are made of engineering plastics.

Comparing with the prior art, the present invention "method and device for filtering liquid in aquarium" has the advantageous effects:

1. The wastewater filtered firstly flows into the filtration device, then is treated through the inner filtration body, filtration material and outer filtration body and flows out from the filtration device, thus ensuring all wastewater via the filtration device to be filtered and improving the effectiveness of water treatment;

2. Due to the particular flow route, namely the wastewater flows in from the water inlet of the filtration device and then the filtered water flows out from the grid panels of the filtration device, the dirt is left inside the filtration device after filtration and will not flow back into the aquarium for the replacement of the filtration device as filtration consumable;

3. The filtration device has the advantages of large filtration section, easy replacement of the filtration device and low cost;

4. The filtration device comprises the first, the second and the third buffer space, so the water pressure inside the filtration device keeps the same, the liquid current passes through the inner filtration body, the filtration materials and the outer filtration body evenly, thus realizing high utilization rate of the inner, outer filtration bodies and the filtration materials as well as superior filtration effect.

5. The filtration device can be used either for outside-aquarium filtration treatment in combination with the filter hung outside the aquarium, or for submersible treatment in combination with the submersible pump, having good universality.

6. The filtration device is provided with multiple filtration materials in the limited space, for multi-functional filtration.

DETAILED DESCRIPTION OF THE PREFERRED EMBODIMENT

The preferred embodiment is further detailed as follows in combination with the figures.

The present invention relates to a method for filtering liquid in an aquarium, comprising the following steps:

A. Use box-shaped liquid filtration device, set water inlet around a box-shaped casing of the filtration device and set grid panels inside both sides of the casing, after the liquid to be filtered flows from the water inlet into the filtration device, the clean liquid filtered flows out from the grid panels;

B. The inner filtration body and outer filtration body are set respectively inside and outside the grid panels of the filtration device, between the inner filtration body and grid panels sets the filtration materials.

In Step A, the casing of the filtration device includes two enclosures with symmetrically set grid panels, wherein the two enclosures are integrated as a whole by means of ultrasonic welding or adhesive.

The Step B further comprises the following steps:

B1. The two outer filtration bodies are respectively fixed outside the grid panels of their own by means of adhesive or heating sticking;

B2. Two filtration body hold-down with grids are set by taking the central plane parallel to the grid panels as a symmetrical plane in the filtration device;

B3. The two filtration body hold-down are fixed respectively inside the casing together with the inner filtration bodies of their own, thus fowling the first buffer space between the opposite sides of the two filtration body hold-down, the second buffer space between the surrounding of the two filtration body hold-down and the inner wall of the enclosure, and two third buffer spaces between the corresponding inner filtration bodies and the grid panels.

B4. The filtration materials are filled in the two third buffer spaces respectively.

The abovementioned first, the second and the third buffer space make the pressure of the liquid inside the filtration device the same, so the liquid current passes through the inner filtration body, the filtration materials and the outer filtration body evenly, thus heightening the utilization rate of the inner, outer filtration bodies and the filtration materials as well as obtaining fine filtration effect.

In Step B3, the two filtration body hold-down are fixed respectively inside the casing together with the inner filtration bodies of their own by means of ultrasonic welding, adhesive, tight fit or snaps. At least two bosses are set respectively on the positions corresponding to the opposite sides of the two filtration body hold-down, thus forming the first buffer space between the opposite sides of the two filtration body hold-down.

The aforesaid liquid filtration method can further use the following methods to enable the filtration device to meet complete liquid treatment functions: in Step A, both grid panels include the first grid zone near the water inlet of the filtration device and the second grid zone away from the water inlet respectively, wherein the mesh area for the first grid zone is larger than that for the second grid zone; In Step B4, grain-sized filtration materials for ion exchange or absorbing harmful substances in the water are filled in the third buffer space corresponding to the first grid zone; grain-sized filtration material capable of culturing nitrifying bacteria are filled in the third buffer space corresponding to the second grid zone. The grain-sized filtration materials for ion exchange or absorbing harmful substances in water are activated carbon or Maifanite, a medicinal stone; grain-sized filtration materials capable of culturing nitrifying bacteria are zeolite.

The water permeability of the inner filtration body is higher than that of the outer filtration body. The liquid inside the filtration device is first treated by the inner filtration body for filtering out large-sized dirt in the liquid, and then further treated by the outer filtration body for filtering out mid and small-sized dirt in the liquid, in this way to improve the efficiency of liquid filtration.

The above-mentioned liquid filtration method can either be directly used for liquid filtration treatment of aquarium, or for the filter with the prior art; the liquid filtration method further includes Step C: with aid of necessary pipes, the water inlet of the filtration device is connected with the submersible pump or the filter hung outside the aquarium, wherein the filtration device is used as a filtration consumable. Compared with the prior art submersible filtration method, the liquid filtration method for the present invention has the advantages of the increase of liquid filtration treatment area and the prevention of the dirt backflow when replacement of the filtration device as filtration consumable; comparing with the prior art method of the filter hung outside the aquarium, the filtration device can substitute for cardcase-shaped filtration insert, thus effectively avoiding the dirt backflow phenomenon during replacement of the filtration device as filtration consumable.

Figure 1:
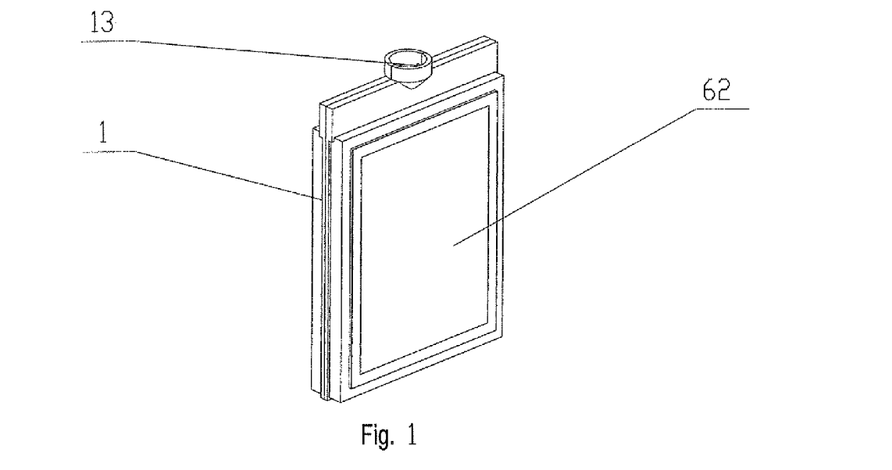
FIG. 1 is the axonometric-projection schematic view of the preferred embodiment for the present invention "method and device for filtering liquid in aquarium"
Figure 2:
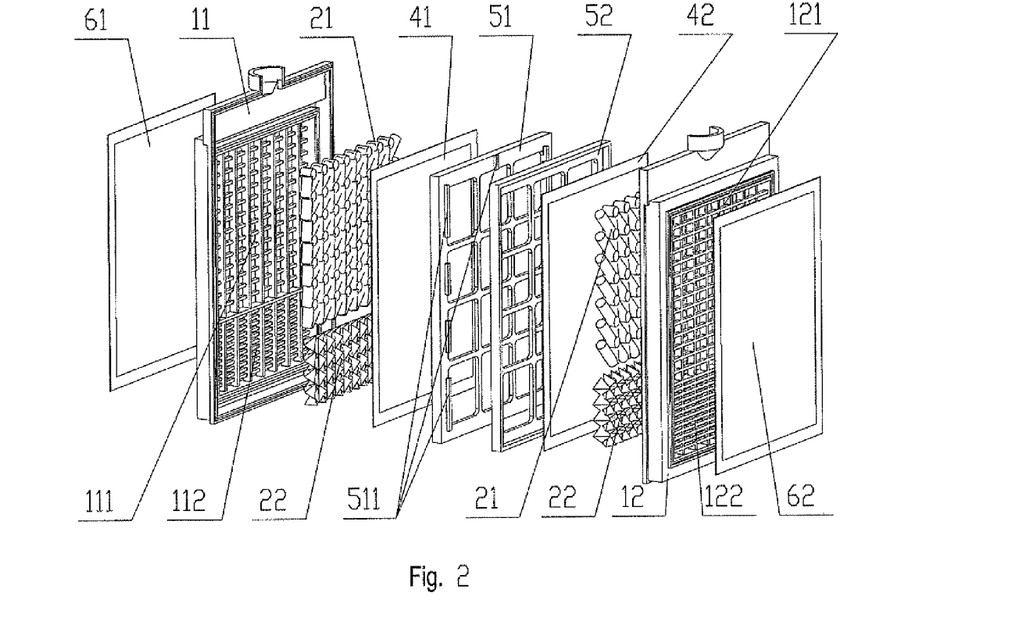
FIG. 2 is the axonometric-projection schematic view of the preferred embodiment in the exploded state.

The present invention further relates to the device for filtering liquid in an aquarium by using the above-mentioned liquid filtration method, as shown in FIG. 1 and FIG. 2, comprising a box-shaped casing 1 and filtration bodies, as well as filtration materials set inside the casing 1, wherein the box-shaped casing 1 includes a water inlet 13 set around the casing 1 and grid panels set inside both sides of the casing 1; the filtration bodies include an inner filtration body set inside the grid panels and an outer filtration body set outside the grid panels; the filtration materials are filled inside the casing 1, between the inner filtration body and grid panels; in this way, the liquid to be filtered enters into the casing 1 through the water inlet 13 and will flow out from the grid panels and proceed further from the casing 1 via the treatment of the inner filtration body, filtration materials and outer filtration body.

The casing 1 includes two enclosures with symmetrically set grid panels 11, 12 of their own, wherein the two enclosures are integrated as a whole. The preferred embodiment for the present invention, as shown in FIG. 1 and FIG. 2, is composed of a flat-box type enclosure 1, around the enclosure 1 a water inlet 13 is set. The enclosure 1 made of engineering plastics comprises two enclosures grid panels 11, 12 of their own, the two enclosures are welded by ultrasonic method or bonded by adhesive together to form an integrated enclosure 1. The engineering plastics consists of ABS plastics, HIPS plastics and PP plastics, wherein ABS is the abbreviation of Acrylonitrile-Butadiene-Styrene Copolymer; HIPS means High impact polystyrene; PP indicates Polypropylene.

Figure 3:
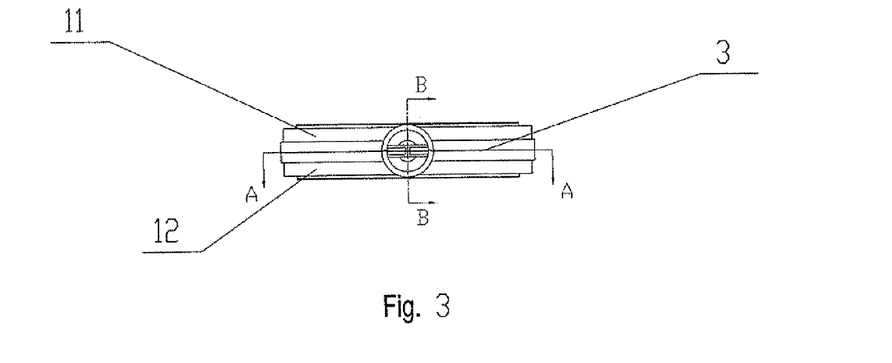
FIG. 3 is the orthographic-projection schematic front view of the preferred embodiment.
Figure 4:
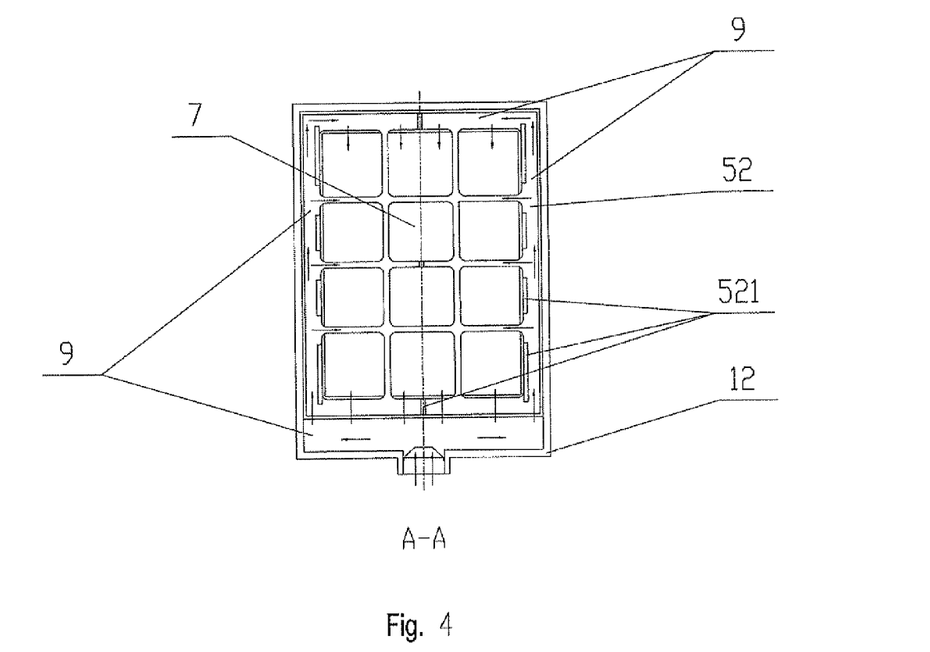
FIG. 4 is the schematic view of A-A section of FIG. 3.
Figure 5:
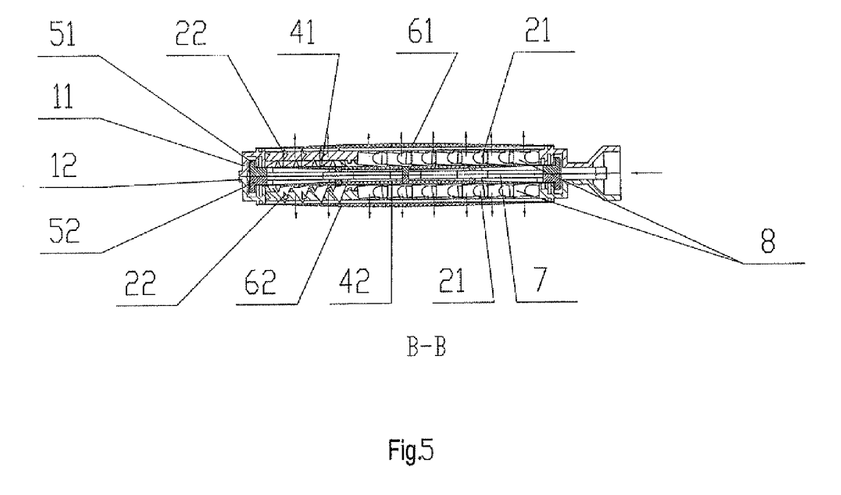
FIG. 5 is the schematic view of B-B section of FIG. 3.

For the preferred embodiment of the present invention as shown in FIG. 1 to FIG. 5, the filtration device further comprises two grid filtration body hold-down 51, 52 taking the central plane 3 parallel to grid panels 11, 12 as symmetrical plane inside the casing 1; the outer filtration bodies 61, 62 are respectively fixed outside the grid panels 11, 12 of their own by means of adhesive or heating sticking; the inner filtration bodies 41, 42 and filtration body hold-down 51, 52 are respectively fixed inside the two grid panels 11, 12 of their own, the inner filtration bodies 41, 42 are respectively fixed between the grid panels 11, 12 and filtration body hold-down 51, 52 of their own; the water permeability of the inner filtration bodies 41, 42 is higher than that of the outer filtration bodies 61, 62, namely, the outer filtration bodies 61, 62 is more compact than the inner filtration bodies 41, 42. The filtration body hold-down 51, 52 are made of the above-mentioned engineering plastics, the hold-down 51, 52 are fixed inside the casing 1 together with the inner filtration bodies 41, 42 of their own by means of ultrasonic welding, adhesive, tight fit or snaps, etc., in this way, fowling the first buffer space 7 between the two filtration body hold-down 51, 52, the second buffer space 9 between the surrounding of the two filtration body hold-down 51, 52 and the inner wall of the enclosure 1, and two third buffer spaces 8 between the inner filtration bodies 41, 42 and the grid panels 11, 12 of their own correspondingly; the filtration materials are filled in the third buffer spaces 8 respectively. At least two bosses 511, 521 of their own are set on the positions corresponding to the opposite sides of the two filtration body hold-down 51, 52; for the preferred embodiment of the present invention as shown in FIGS. 2, 4 and 5, ten bosses 511, 521 of their own are set on the positions corresponding to the surroundings of the opposite sides of the two filtration body hold-down 51, 52, thus forming the first buffer space 7 between the two filtration body hold-down 51, 52. As shown in FIG. 4, the first buffer space 7 communicates with the second buffer space 7, wherein the first buffer space 7 is inside various bosses 511, 521 and the second buffer space 9 is between various bosses 511, 521 and the inner wall of the casing 1.

To make the filtration function of the filtration device more complete, as shown in FIG. 2, the grid panels 11, 12 respectively include the first grid zones 111, 121 near the water inlet 13 and the second grid zones 112, 122 away from the water inlet 13; the mesh area for the first grid zones 111, 121 is larger than that for the second grid zone 112, 122; the filtration materials include the grain-sized filtration materials 21 for ion exchange or absorbing harmful substances in water that is filled in the third buffer space 8 corresponding to the first grid zones 111, 121, and the grain-sized filtration materials 22 capable of culturing nitrifying bacteria that are filled in the third buffer space 8 corresponding to the second grid zone 112, 122. The grain-sized filtration materials 21 for ion exchange or absorbing harmful substances in water are activated carbon or Maifanite, a medicinal stone; the grain-sized filtration materials 22 capable of culturing nitrifying bacteria are zeolite.

Moreover, as shown in FIG. 2, the outer filtration body 61, the enclosure with the grid panel 11, an inner filtration body 41, filtration body hold-down plate 51 and an outer filtration body 62, the enclosure with the grid panel 12, an inner filtration body 42 and a filtration body hold-down plate 52 take the central plane parallel to the grid panels 11, 12 as a symmetrical plane, wherein the central plane parallel to the grid panels 11, 12 is the plane formed by extension of Number 3 indicated line in FIG. 3 in Z-axis direction.

The first buffer space 7, the second buffer space 9 and the third buffer spaces 8 enable the filtration materials 21, 22 to filter the water current evenly. Meanwhile, large-sized dirt will be left in various buffer spaces inside the casing 1 of the filtration device. The integrated replacement of the filtration device in utilization prevents the dirt attached on the inner, outer filtration bodies from flowing back to the aquatic tank.

The appearance of the box-shaped casing 1 can be rectangular, cylindrical, elliptical or polygon-cylindrical. For the preferred embodiment of the present invention as shown in FIG. 1 to FIG. 5, the appearance of the box-shaped casing 1 is rectangular. The mesh of the grid panels 11, 12 are formed by more than two horizontally-set and vertically-set ribs, the grid panels 11, 12 are flat plate type as a whole, the grid panels 11, 12 can be also designed into cylindrical arc plate type as a whole. For the preferred embodiment of the present invention, the grid panels 11, 12 are flat plate type as a whole.

Figure 6:
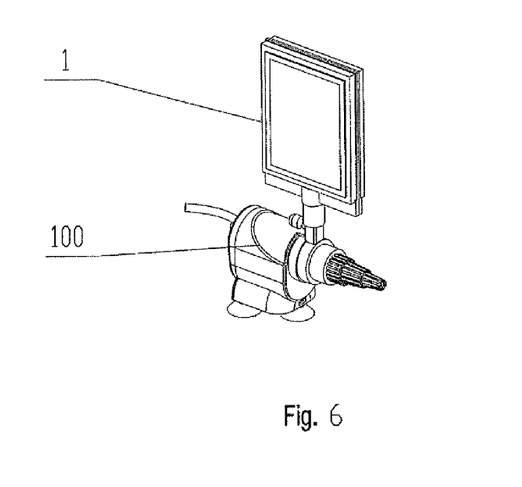
FIG. 6 is the schematic view of the cooperation of the preferred embodiment and the submersible pump 100.
Figure 7:
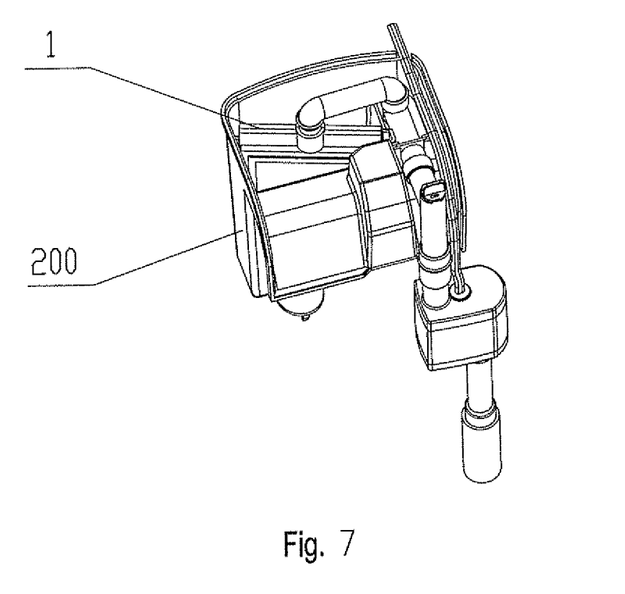
FIG. 7 is the schematic view of the utilization of the preferred embodiment installed inside the filter 200 hung outside the aquarium.

The filtration device is good in universality. After the corresponding water inlet connecting pipe is equipped at the water inlet 13 of the filtration device, the filtration device can perform filtration treatment to the liquid flowing into the device; moreover, the filtration device can be also applied into the filtration equipment with the prior art as a filtration consumable. As shown in FIG. 6, the filtration device in the preferred embodiment of the present invention can be used with the submersible pump 100 put inside the aquarium cooperatively in a direct way. Compared with using a submersible filter in the prior art, the filtration method shown in FIG. 6 increases the filtration section area and avoids the problem of the backflow of the dirt left after filtration into the cardcase-shaped. According to FIG. 7, in the preferred embodiment of the present invention, the filtration device can be also installed inside the filter 200 hung outside the aquarium for utilization: the water pump of the filter 200 hangs outside the aquarium extracts the liquid inside the aquarium into the filtration device, then resultant liquid through this filtration device flows from the inclined water outlet of the filter 200 hung outside the aquarium into the aquarium. The filtration method shown in FIG. 7 not only retains the merit of the cardcase-shaped filtration insert in the prior art, but also addresses the problems that the filtration effect is weakened due to the blocking of cardcase-shaped filtration insert after operation for some time and the dirt left after filtration flows back to the aquarium.

The invention claimed is:

1. A method for filtering liquid in an aquarium, characterized in that, and comprising the following steps:
   A. Use a liquid filtration device, set water inlet around a casing of the filtration device and set grid panels inside both sides of the casing, after the liquid to be filtered flows through the water inlet into the filtration device, the clean liquid filtered flows out from the grid panels; the casing of the filtration device includes two enclosures with symmetrically set grid panels, wherein the two enclosures are integrated as a whole by means of ultrasonic welding or adhesive;
   B. An inner filtration body and outer filtration body are set respectively inside and outside the grid panels of the filtration device, between the inner filtration body and grid panels sets filtration materials;
   The Step B further comprises the following steps,
   B1. Two outer filtrations bodies are respectively fixed outside the grid panels of their own by means of adhesive of heating sticking;
   B2. Two filtration body hold-down with grids are set by taking the central plane parallel to the grid panels as a symmetrical plane in the filtration device;
   B3. The two filtration body hold-down are fixed respectively inside the casing together with the inner filtration bodies of their own, thus forming first buffer space between the opposite sides of the two filtration body hold-down, second buffer space between the surrounding of the two filtration body hold-down and the inner wall of the enclosure, and two third buffer spaces between the corresponding inner filtration bodies and the grid panels;
   B4. The filtration materials are filled in the two third buffer spaces respectively.

2. The method for filtering liquid in an aquarium according to claim 1, characterized in that:
   In Step B3, the two filtration body hold-down are fixed respectively inside the casing together with the inner filtration bodies of their own by means of ultrasonic welding, adhesive, tight fit or snaps.

3. The method for filtering liquid in an aquarium according to claim 1, characterized in that:
   In Step B3, at least two bosses are set respectively on the positions corresponding to the opposite sides of the two filtration body hold-down, thus forming the first buffer space between the opposite sides of the two filtration body hold-down.

4. The method for filtering liquid in an aquarium according to claim 1, characterized in that:
   In step A, both grid panels include the first grid zone near the water inlet of the filtration device and the second grid zone away from the water inlet respectively, wherein the mesh area for the first grid zone is larger than that for the second grid zone;

In Step B4, grain-sized filtration materials for ion exchange or absorbing harmful substances in the water are filled in the third buffer space corresponding to the first grid zone; grain-sized filtration material capable of culturing nitrifying bacteria are filled in the third buffer space corresponding to the second grid zone.

5. The method for filtering liquid in an aquarium according to claim 4, characterized in that:

The grain-sized filtration materials for ion exchange or absorbing harmful substances in water are activated carbon or Maifanite, a medicinal stone; grain-sized filtration materials capable of culturing nitrifying bacteria are zeolite.

6. The method for filtering liquid in an aquarium according to claim 1, characterized in that:

The water permeability of the inner filtration body is higher than that of the outer filtration body.

7. The method for filtering liquid in an aquarium according to claim 1, characterized in that:

Further including Step C: with aid of necessary pipes, the water inlet of the filtration device is connected with submersible pump or the filter hung outside the aquarium.

8. A device for filtering liquid in aquarium, characterized in that:

Comprising a casing, and filtration bodies and filtration materials inside the casing, wherein the casing includes a water inlet set around the casing and grid panels set inside both sides of the casing; the casing includes two enclosures with symmetrically set grid panels of their own, wherein the two enclosures are integrated as a whole;

the filtration bodies include an inner filtration body set inside the grid panels and an outer filtration body set outside the grid panels; the filtration materials are filled inside the casing, between the inner filtration body and grid panels; in this way, the liquid to be filtered enters into the casing through the water inlet and will flow out from the grid panels and proceed further from the casing via the treatment of the inner filtration body, filtration materials and outer filtration body;

the device comprising two filtration body hold-down with grids taking the central plane parallel to grid panels as symmetrical plane in the casing; the outer filtration bodies are respectively fixed outside the grid panels of their own; the inner filtration bodies are respectively fixed between the grid panels of their own and the filtration body hold-down; the two filtration body hold-down are fixed respectively inside the casing together with the inner filtration bodies of their own, forming the first buffer space between the two filtration body hold-down, the second buffer space between the surrounding of the two filtration body hold-down and the inner wall of the casing, two third buffer spaces between the inner filtration bodies and the grid panels of their own correspondingly; the filtration materials are respectively filled in the third buffer space.

9. A device for filtering liquid in aquarium according to claim 8, characterized in that:

At least two bosses of their own are set on the positions corresponding to the opposite sides of the two filtration body hold-down, thus forming the first buffer space between the two filtration body hold-down.

10. A device for filtering liquid in aquarium according to claim 8, characterized in that:

The grid panels respectively include the first grid zones near the water inlet and the second grid zones away from the water inlet; the mesh area for the first grid zones is larger than that for the second grid zone; the filtration materials include the grain-sized filtration materials for ion exchange or absorbing harmful substances in water that is filled in the third buffer space corresponding to the first grid zones, and the grain-sized filtration materials capable of culturing nitrifying bacteria that are filled in the third buffer space corresponding to the second grid zone.

11. A device for filtering liquid in aquarium according to claim 10, characterized in that:

The grain-sized filtration materials for ion exchange or absorbing harmful substances in water are activated carbon or Maifanite, a medicinal stone; the grain-sized filtration materials capable of culturing nitrifying bacteria are zeolite.

12. A device for filtering liquid in aquarium according to claim 8, characterized in that:

The water permeability of the inner filtration bodies is higher than that of the outer filtration bodies.

13. A device for filtering liquid in aquarium according to claim 8, characterized in that:

The meshes of the grid panels are formed by more than two horizontally-set and vertically-set ribs, each grid panel as a whole is plank in shape.

14. A device for filtering liquid in aquarium according to claim 8, characterized in that:

The casing and filtration body hold-down are made of engineering plastics.

* * * * *